UNITED STATES PATENT OFFICE.

JOHN BLAKE KENDALL, OF WASHINGTON, DISTRICT OF COLUMBIA.

BALL-BEARING.

SPECIFICATION forming part of Letters Patent No. 596,886, dated January 4, 1898.

Application filed August 27, 1897. Serial No. 649,731. (No model.)

*To all whom it may concern:*

Be it known that I, JOHN BLAKE KENDALL, of Washington, in the District of Columbia, have invented certain new and useful Improvements in Ball-Bearings; and I do hereby declare that the following is a full, clear, and exact description thereof, reference being had to the accompanying drawings, in which—

Figure 1 is a perspective view of my ball-carrying sleeve or thimble; Fig. 2, a view in perspective of the halves of the sleeve or thimble before being united and one of the ball-holding rings or races; Fig. 3, a longitudinal section of a carriage-wheel hub and axle with my invention applied; Fig. 4, a cross-section on the line $x\ x$ of Fig. 3. Figs. 5 and 6 are respectively longitudinal and cross-sectional views of a different form of my invention.

Letters of like name and kind refer to like parts in each of the figures.

The object of my invention is to materially cheapen the cost of and to simplify the construction required in applying ball-bearings to the wheels of carriages, wagons, trucks, &c.; and to this end said invention consists in the features of construction substantially as hereinafter specified.

In the carrying of my invention into practice I place within the hub A of a wheel a sleeve or thimble B, having near each end and preferably midway between its ends an annular enlargement C. Within each annular enlargement is a ring or annulus D, that partially incloses and forms a race for a series of balls E and E, that touch the periphery of the axle E'. If need be, however, the ring D may be discarded and the balls placed directly in the cavities of the enlargements, being made to fit so close together in each that they will not fall out when the axle is withdrawn. I preferably employ the ring, however, as it can be made to overhang the balls, and thus insure their retention, even though they are rather loose therein, and as it is a more satisfactory and cheaper way of forming a hard ball-race than is the case when the annular sleeve enlargement constitutes said race. Besides, as will appear from the mode of constructing the sleeve, to be hereinafter described, the balls can more easily be secured within the sleeve.

To enable the balls to be placed in position within the sleeve, the latter, preferably made of thin wrought-iron or steel to permit of drop-forging, is originally made in duplicate diametrically-divided halves, and then the balls, either with or without the rings D, are placed in the annular enlargements and the edges of the halves are secured together, preferably by brazing.

To produce a good joint, each half has a radial flange $b$ projecting from each edge, and the flanges of the two, when fastened together, form longitudinal ribs or fins to engage the wheel-hub and firmly secure the sleeve thereto.

Instead of arranging the balls in circular or annular series the construction shown in Figs. 5 and 6 may be employed, in which there are several straight series of balls extending lengthwise of the sleeve, the sleeve being provided with straight longitudinally-extending hollow enlargements $b'$ and $b'$. Preferably a race D' is employed, in which the balls are placed; but of course they may be put directly in the enlargements instead. The enlargements serve as the customary peripheral ribs on the sleeve to secure the latter to the hub, and, if preferred, when they are used the flanges $b$ and $b$ may be dispensed with.

Preferably at the inner end the sleeve is provided with an annular flange F to receive the knocks or blows by which the same is driven into the hub and which by engaging the end of the hub limits its insertion and fixes its position in the latter.

It will be apparent that from the standpoints of simplicity, economy of manufacture, and facility of removing the wheel from and replacing it upon the axle for oiling or other purposes my construction possesses marked advantages. With reference to the last point it is to be remarked that there are no parts requiring careful adjustment, troublesome to remove and replace, and in danger of being lost when the wheel is removed from the axle.

Of course rolls can be substituted for balls, and in construing the claims rolls are to be understood as the equivalents of balls.

Without restricting the scope of my inven- (No Model.)
T. H. KENVIN.
WINDOW FIXTURE.
No. 596,887.    Patented Jan. 4, 1898.
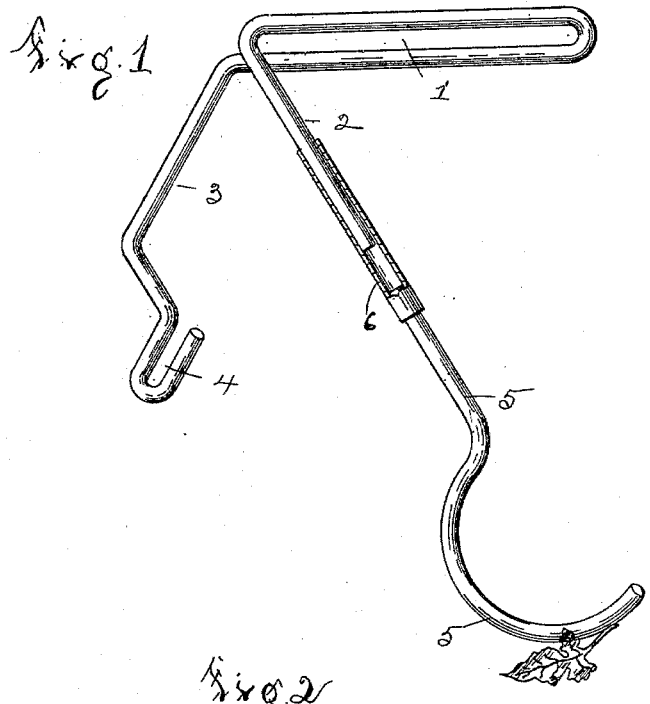
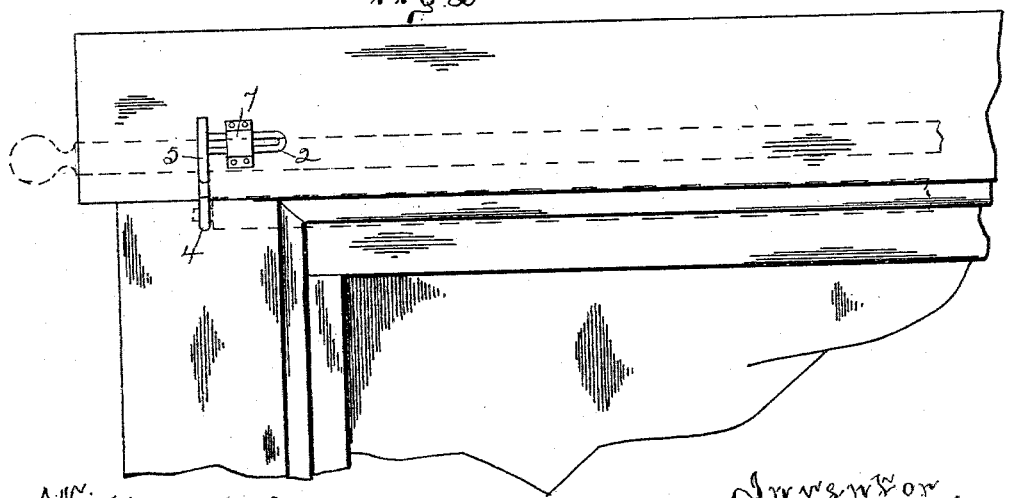
Witnesses:
Inventor.
Thomas H. Kenvin

UNITED STATES PATENT OFFICE.

THOMAS H. KENVIN, OF HOMESTEAD, PENNSYLVANIA.

WINDOW-FIXTURE.

SPECIFICATION forming part of Letters Patent No. 596,887, dated January 4, 1898.

Application filed June 22, 1897. Serial No. 641,772. (No model.)

*To all whom it may concern:*

Be it known that I, THOMAS H. KENVIN, a citizen of the United States, residing at Homestead, in the county of Allegheny and State of Pennsylvania, have invented certain new and useful Improvements in Window-Fixtures; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in window-fixtures.

The invention has for its object the provision of a combined curtain-pole and window-blind bracket and which is capable of adjustment.

With the above object in view the invention finally consists in the novel construction, combination, and arrangement of parts, as will be hereinafter more specifically described.

In describing the invention in detail reference is had to the accompanying drawings, forming a part of this specification, and wherein like numerals designate like parts throughout both views, in which—

Figure 1 is a perspective view of my improved bracket. Fig. 2 is a portion of a window-frame, showing one of the brackets attached thereto.

To construct my improved bracket, I provide a wire of suitable length and thickness and bend the same near its middle, so as to form the loop 1. The upper end of the wire is then bent out at right angles, as indicated by 2, and the opposite end 3 is bent downwardly at right angles with the said loop and opposite end, and at the extreme end is formed the hook 4, which is adapted to receive the end bearing-piece of the window-blind. The extension-piece 5 is of the same material and has formed upon its outer end a semicircular loop, upon which the curtain-pole is adapted to be supported, and the opposite end has secured thereto the sleeve 6, by which it is adjustably attached to the portion of the bracket 2, as shown.

In practice a pair of brackets are employed, both of which are similarly constructed, excepting that the loop portions are formed upon opposite sides, so as to be a right and left, and in applying them to the window-frame the straps or slides 7 are secured to the frame and the loop portion fitted beneath the strap or slides, as shown, and may be adjusted to suit the length of the blind-roller and curtain-pole.

Having thus shown and described my invention, what I claim as new, and desire to secure by Letters Patent, is—

As an improved article a combined curtain-pole and window-blind bracket, consisting of the wire rod, bent near its center forming two parallel arms, one of which is bent downwardly and then inwardly at right angles and its extremity bent into a hook, and the other arm bent at a right angle to the adjustable sleeve mounted thereon, and the rod fitting in said sleeve and having its outer end curved, substantially as shown and described.

In testimony whereof I affix my signature in presence of two witnesses.

THOMAS H. KENVIN.

Witnesses:
JAS. J. MCAFEE,
H. J. LEVIS.